Sept. 14, 1965  J. M. KRAMER  3,206,229

FLEXIBLE SEALED CONNECTOR

Filed July 20, 1962  2 Sheets-Sheet 1

INVENTOR.
JACK M. KRAMER
BY Lyon & Lyon
ATTORNEYS

Sept. 14, 1965    J. M. KRAMER    3,206,229
FLEXIBLE SEALED CONNECTOR
Filed July 20, 1962    2 Sheets-Sheet 2

INVENTOR.
JACK M. KRAMER
BY Lyon+Lyon
ATTORNEYS

United States Patent Office 3,206,229
Patented Sept. 14, 1965

3,206,229
FLEXIBLE SEALED CONNECTOR
Jack M. Kramer, Los Alamitos, Calif. (% General Connectors & Ducting Corp., 233 W. Orange Ave., Burbank, Calif.)
Filed July 20, 1962, Ser. No. 211,264
4 Claims. (Cl. 285—114)

This invention relates to flexible sealed connectors, and included in the objects of this invention are:

First, to provide a flexible sealed connector which is particularly adapted for use under conditions of high temperatures such as the conditions inherent in gas turbine installations.

Second, to provide a flexible sealed connector which incorporates a novel sealing element having a heat-resistant fabric covering and a yieldable core so arranged that heat transfer through the covering is minimized to protect the core.

Third, to provide a flexible sealed connector which is adapted to be utilized on thin gage tubing, and wherein the bridging or coupling sleeve of the connector is formed of thin gage metal, thereby providing a lightweight or low mass connector for use on aircraft or in environments wherein the connector is subject to vibration.

Fourth, to provide a flexible sealed connector which utilizes novel tension elements for restraining the tubing joined by the coupling against axial separation.

Fifth, to provide a flexible sealed connector, one embodiment of which utilizes an annular coupling sleeve in the form of a thin wall tube having annular channels to receive sealing elements.

Sixth, to provide a flexible sealed connector, another embodiment of which utilizes a pair of complementary members forming an axially split sleeve, incorporating a channel means to receive axially extending, as well as circumferentially extending, sealing elements.

With the above and other objects in view, as may appear hereinafter, reference is directed to the accompanying drawings in which:

FIGURE 4 is a diagrammatical, perspective view, showing the step of preparing the fabric covering utilized in the construction of the seal ring;

FIGURE 5 is a sectional view of the seal ring core and adjacent portions of the mandrel, showing the initial step of wrapping the fabric about the core;

FIGURE 6 is a fragmentary, sectional view similar to FIGURE 5, showing the fabric wrapped a further distance about the core;

FIGURE 7 is a fragmentary, sectional view showing the core partially wrapped by the fabric and placed in one of the mold members;

FIGURE 8 is a similar fragmentary, sectional view showing the fabric completely wrapped about the core;

FIGURE 9 is a fragmentary, sectional view showing the mold completely assembled and the seal ring therein;

Figure 1:
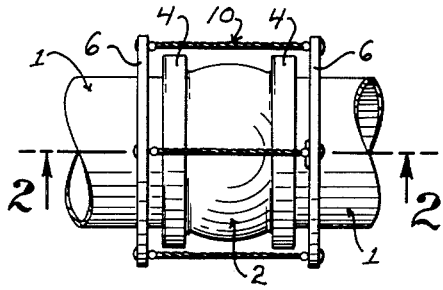
FIGURE 1 is an elevational view of one form of the flexible sealed connector with adjacent tubing sections shown fragmentarily.
Figure 3:
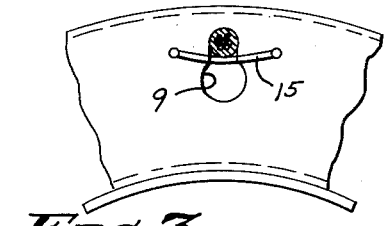
FIGURE 3 is a fragmentary, sectional view taken through 3—3 of FIGURE 2.
Figure 2:
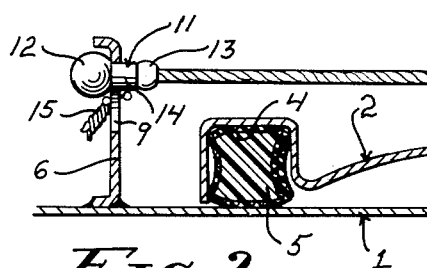
FIGURE 2 is an enlarged, fragmentary, sectional view taken through 2—2 of FIGURE 1.
Figure 10:
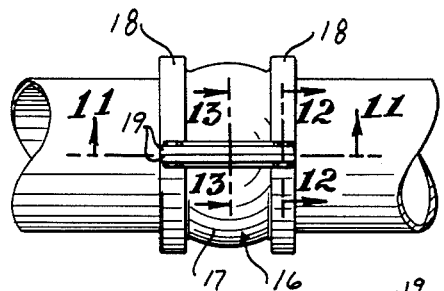
FIGURE 10 is an elevational view showing a modified form of the flexible sealed connector with adjacent portions of the tubing sections shown fragmentarily.
Figure 11:
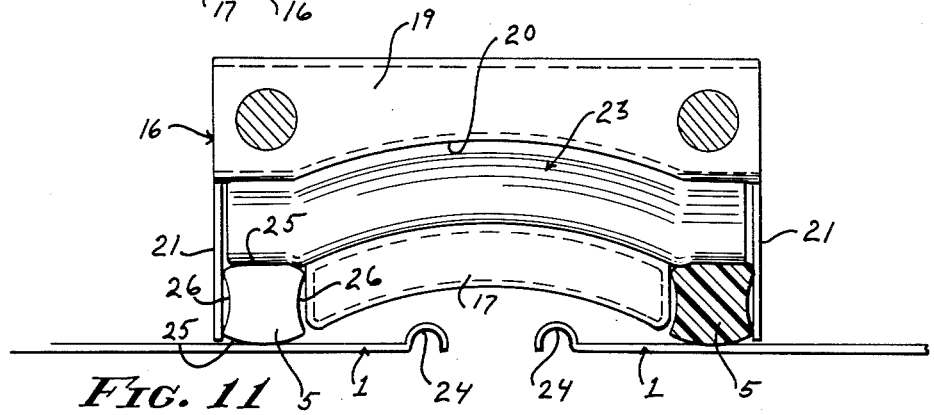
FIGURE 11 is an enlarged, fragmentary, sectional view taken through 11—11 of FIGURE 10.
Figure 12:
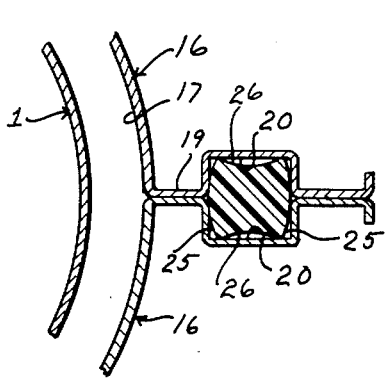
FIGURE 12 is an enlarged, fragmentary, sectional view taken through 12—12 of FIGURE 10.
Figure 13:
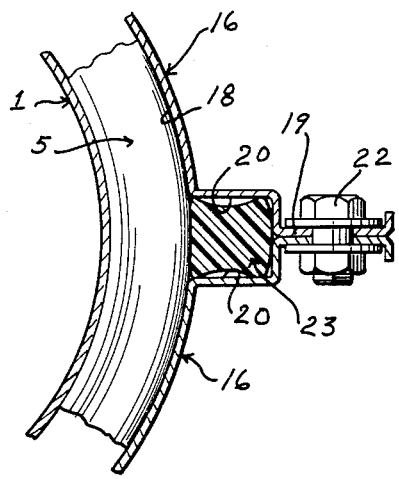
FIGURE 13 is a similar enlarged, fragmentary, sectional view taken through 13—13 of FIGURE 10.

Reference is first directed to the flexible sealed connector shown in FIGURES 1, 2 and 3. A pair of tubing sections 1 are provided. The tubing sections may be integral portions of a tubing system or may be provided with any conventional means (not shown) for fixed connection to a tubing system. In either case, insofar as the connector is concerned, the tubing sections are of uniform diameter and preferably formed of thin gage metal.

The confronting ends of the tubing sections 1 are bridged by an annular coupling sleeve 2, preferably formed of thin gage metal. The central portion of the coupling sleeve 2 defines a spherical zone 3. The axial extremities of the coupling sleeve 2 are bent radially outward, then axially, then radially inward to form internal end channels 4 of essentially square cross section.

Each end channel 4 receives a seal ring 5, which is radially compressible so as to sealingly engage the tubing section as well as the radially outer surface of the corresponding end channel 4. The construction of the seal ring 5 will be described more particularly hereinafter.

Welded, brazed, or otherwise fixed to each tubing section 1 is an outwardly extending flange 6, preferably formed of sheet metal. For purposes of reinforcement, the radially outer and radially inner peripheries of the flanges 6 form axially directed rims 7 and 8. The flanges 6 are disposed in axially spaced relation to the ends of the coupling sleeve 2 and are provided with sets of key slots 9, the number of which depends upon the diameter of the coupling 2. Each key slot 9 has a narrow end directed radially outward.

A set of tension cables 10 is provided. Each tension cable is formed of multiple strand, high strength wire, and is provided at each end with a ferrule 11 having an axially outer knob 12 and an axially inner knob 13, forming therebetween a short shank 14.

The axially outer knobs 12 are dimensioned to pass through the larger ends of the key slots 9 and the shanks 14 are adapted to be received in the smaller portions of the key slots 9, so that the knobs 12 limit axially outward displacement of the flanges 6 and tubing sections.

Each tension cable 10 is retained in place by means of a lock wire 15, which is threaded through small perforations provided on either side of each key slot 9.

The axial dimension of the coupling sleeve 2, the axial location of each flange 6 with respect to the extremity of its tubing section 1, and the length of the tension cables 10 are so related that, when the coupling is assembled, either end will engage a flange 6 before the opposite end clears the other tubing section 1.

It will be observed that under normal operation pressure exists within the tubing system joined by the connector so that the cables 10 are maintained under tension. However, should it be desirable to deflect one tubing section 1 into angular relation with the other, in which case the flanges 6 are disposed in converging planes, the tension cables 10 permit the necessary movement of corresponding sides of the flanges 6 toward each other and simply occupy a slacked condition.

Reference is now directed to FIGURES 10 through 13. The structure here illustrated differs from the first described structure in that the flexible sealed connector is divided into two complementary sections. More particularly, a pair of semicircular coupling members 16 are provided, which together define a central portion 17 in the form of a spherical zone and annular end channels 18 corresponding to the end channels 4.

At their confronting surfaces the two coupling members 16 are provided with mating flanges 19 which project radially outward. Formed in the flanges 19 are axially directed channels 20, the central portions of which may be arcuate in substantial parallelism with the curved surface of the central portion 17. Formed at the confronting ends of the coupling members 16 are end tabs 21, which are in confronting mutual engagement, to close the ends of the axial channels 20 and complete the end channels 18. Bolts 22 extend through the flanges 19 to join the two halves of the coupling members 16 together.

The end channels 18 receive seal rings 5, whereas the axial channels 20 receive seal elements 23. The seal elements are similar in cross section to the seal rings 5. The axial channels 20 are so related to the end channels 18 that the ends of the seal elements 23 are in sealing engagement with the seal rings 5, so that when the split coupling member 16 is fastened around a pair of tubing sections 1 a complete seal is formed.

By reason of the fact that the connector shown in FIGURES 10 through 13 is split, the ends of the tubing sections 1 may be provided with annular beads or flanges 24 to limit axial displacement of the tubing sections 1. Alternatively, the tubing sections may be provided with flanges 6 connected by tension cables 10, as in the first described structure.

The seal rings 5 and seal elements 23 are four-sided in cross section. The radially inner and radially outer sides are convex, as indicated by 25, whereas the remaining two sides are concave, as indicated by 26. With this arrangement, the seal ring 5, for example, may be compressed in a radial direction and the material thereof displaced in an axial direction, which has the effect of reducing the concave nature of the axial sides. By reason of the fact that the seal ring 5 is essentially square in cross section and, except for the concave sides, substantially fills the channels 4 or 18, the rings 5 are restrained against rotation about their toroidal axes when the rings 5 slide on the tubing sections 1.

The flexible sealed connector is particularly adapted for use in high temperature installations. For this purpose, the seal ring 5 or the seal element 23 includes a core 27 and a fabric covering 28. The fabric covering is formed of glass fiber or other fibers, inherently capable of standing elevated temperatures, which are woven. A strip of the woven fabric cut on the bias is wrapped about a mandrel 29 to form a partial overlap 30.

The fabric is first impregnated with a high temperature elastomer, such as a high temperature silicone loaded with iron oxide. The core 27 is separately formed of a high temperature silicone and is placed on the mandrel 29 so that the fabric may be wrapped thereabout, as shown in FIGURES 5 and 6. After partially wrapping the fabric about the core 27, the fabric and core are placed in a mold member 31, as shown in FIGURE 7, which contacts two sides of the seal ring 5, whereupon wrapping of the fabric is completed, as shown in FIGURE 8. The seal ring 5 is completely encased by appropriate additional mold members 32 and 33, as shown in FIGURE 9, so that the ring 5 may be cured.

The seal element 23 is formed in a like manner except, of course, that the seal element is initially in the form of a straight bar.

The resulting seal ring 5, or seal element 23, as the case may be, is able to withstand temperatures which are detrimental to the silicone used. This is apparently due to the fact that the glass fibers of the fabric tend to insulate the core 27, that is, the core is maintained at a temperature somewhat below the surfaces which are in contact with the tubing sections 1.

While particular embodiments of this invention have been shown and described, it is not intended to limit the same to the exact details of the constructions set forth, and it embraces such changes, modifications, and equivalents of the parts and their formation and arrangement as come within the purview of the appended claims.

What is claimed is:

1. A flexible sealed connector for joining a pair of confronting tubular members, said connector comprising:
   (a) a coupling sleeve structure encircling the confronting ends of said tubular members and being spaced radially therefrom to permit angular displacement of said tubular members, and defining annular internal channels at its extremities;
   (b) and annular seal rings in said channels, each seal ring including a core formed of a high temperature silicone elastomer and a covering formed of an elastomer-impregnated woven glass fabric encasing said core, said covering partially insulating said core against transfer of heat from said tubular members and maintaining said core at a lower temperature than the outer surface of said covering;
   (c) each seal ring having radially inner and radially outer sides defining smoothly convex surfaces extending across the entire width thereof and concave axial sides forming a pair of radially outer corners and a pair of radially inner corners, said seal rings fitting snugly in said channels with the two radially outer corners and at least one radially inner portion of an axial side bearing against the walls of a corresponding channel to restrain said rings against rotation about their toroidal axes, said concave sides forming expansion spaces to permit axial expansion of the midportions of said axial sides on radial compression of said seal ring.

2. An annular seal assembly comprising a holder defining an annular channel of essentially rectangular cross section, and a seal element comprising:
   (a) an annular, radially compressible core defining, in cross section, a four-sided figure;
   (b) said seal element being externally contoured to form a four-sided figure having radially outer and radially inner sides defining smoothly convex surfaces extending across the entire width thereof and concave axial sides defining a pair of radially outer and a pair of radially inner protruding corners;
   (c) said seal element being dimensioned to fit snugly in said annular channel with said radially outer corners and at least one radially inner portion of an axial side in bearing contact with the walls of said channel to resist rotation of said seal element about its toroidal axis.

3. A flexible sealed connector for joining a pair of confronting tubular members, said connector comprising:
   (a) a coupling sleeve structure encircling the confronting ends of said tubular members and being spaced radially therefrom to permit angular displacement of said tubular members, and defining annular internal channels at its extremities, each of said channels being essentially rectangular in cross section;
   (b) and annular seal rings in said channels, each of said seal rings having radially inner and outer sides defining smoothly convex surfaces extending across the entire width thereof and concave axial sides forming a pair of radially outer corners and a pair of radially inner corners, said seal rings fitting snugly in said channels with the two radially outer corners and at least one radially inner portion of an axial side bearing against the walls of a corresponding channel to restrain said rings against rotation about their toroidal axes, said concave sides forming expansion spaces to permit axial expansion of the midportions of said axial sides on radial compression of said seal ring.

4. A flexible sealed connector as defined in claim 3 including a pair of confronting tubular members, said coupling sleeve encircling the confronting ends of said tubular members with said annular seal rings, respectively, sealingly embracing said tubular members, a flange on each tubular member axially spaced from said coupling sleeve, and flexible tension elements secured to said flanges and extending axially therebetween to limit axial separation of said tubular members.

(References on following page)

References Cited by the Examiner

UNITED STATES PATENTS

| | | | |
|---|---|---|---|
| 1,941,358 | 12/33 | Longfellow | 285—114 |
| 2,087,916 | 7/37 | Lanninger | 285—369 |
| 2,165,296 | 7/39 | Oass | 277—230 |
| 2,686,747 | 8/54 | Wurtz | 277—230 |
| 2,751,794 | 6/56 | Sandberg | 287—82 X |
| 2,774,621 | 12/56 | Kilbourne | 277—209 |
| 2,822,191 | 2/58 | Risley | 285—337 |
| 2,841,429 | 7/58 | McCuistion. | |
| 2,913,262 | 11/59 | De Cenzo | 285—373 |
| 2,954,264 | 9/60 | Tisch | 277—209 |
| 2,958,546 | 11/60 | Lee | 285—373 |
| 2,983,527 | 5/61 | Schustack | 285—369 |
| 2,983,533 | 5/61 | Tisch. | |
| 3,023,471 | 3/62 | Nabuda. | |
| 3,029,094 | 4/62 | Parlasca | 285—114 |
| 3,052,478 | 9/62 | Horvereid | 277—209 |

OTHER REFERENCES

Ser. No. 293,149, Boissou (A.P.C.), published, May 25, 1943. Application abandoned.

CARL W. TOMLIN, *Primary Examiner.*